T 860,017

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED MARCH 25, 1969

860 O.G. 1008

629,025
METHOD OF REDUCING NOISE AND AIR POLLUTION

Franklin W. Church, 185 Russell Road, Fanwood, N.J. 07023

Filed Apr. 6, 1967. Published Mar. 25, 1969
Class 55—75
1 Sheet Drawing. 13 Pages Specification

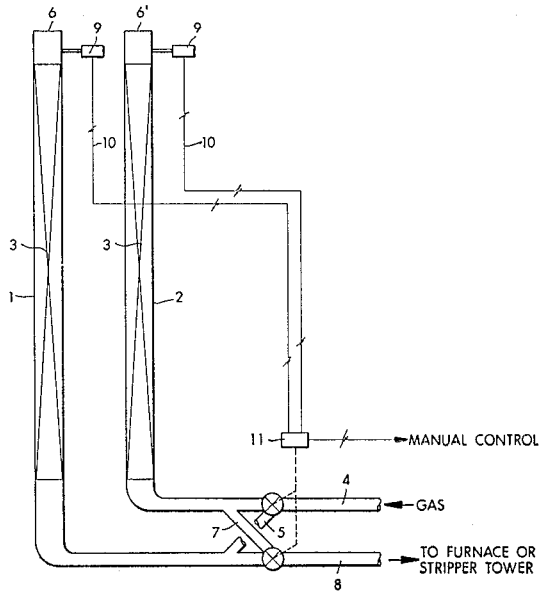

Air and noise pollution caused by the venting of light hydrocarbons to the atmosphere is prevented by adsorbing the hydrocarbons prior to their release. Light hydrocarbons, either aliphatic or aromatic, are passed through an adsorbent bed containing one or more selective solid adsorbents, and only trace amounts of hydrocarbon are vented into the atmosphere. This reduces air pollution caused by light hydrocarbons, as well as noise pollution caused by sudden venting. Two stacks, each having an adsorbent bed, are used so that one bed can be regenerated while the other is on stream. The system may be applied to refinery processing units and to off-site equipment such as storage tanks and tank trucks.

T860,017
SN - 629025
March 25, 1969 F. W. CHURCH DEF. PUB.
METHOD OF REDUCING NOISE AND AIR POLLUTION
Filed April 6, 1967
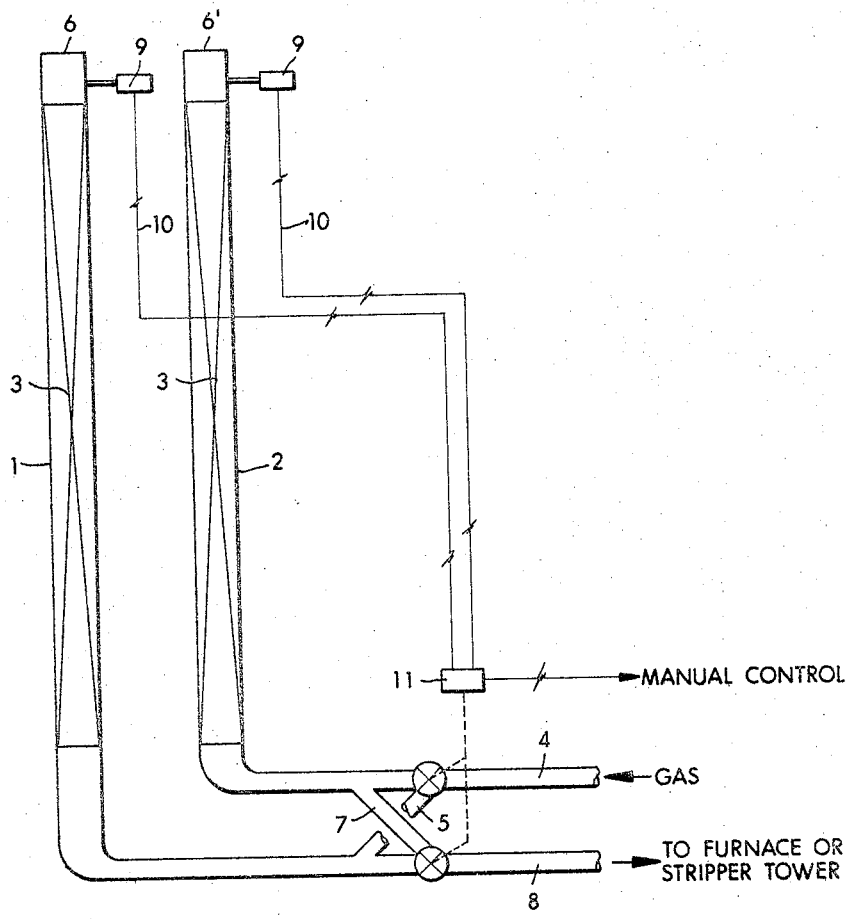
F. W. CHURCH INVENTOR
BY Michael Cannon
PATENT ATTORNEY